(12) United States Patent
Mikami

(10) Patent No.: US 9,708,839 B2
(45) Date of Patent: Jul. 18, 2017

(54) CASING DEVICE AND ELECTRONIC APPARATUS

(71) Applicant: NEC Platforms, Ltd., Kawasaki-shi, Kanagawa (JP)

(72) Inventor: Hayato Mikami, Kanagawa (JP)

(73) Assignee: NEC Platforms, Ltd., Kawasaki-shi (JP)

( * ) Notice: Subject to any disclaimer, the term of this patent is extended or adjusted under 35 U.S.C. 154(b) by 0 days.

(21) Appl. No.: 15/119,168

(22) PCT Filed: Jan. 14, 2015

(86) PCT No.: PCT/JP2015/051430
§ 371 (c)(1),
(2) Date: Aug. 16, 2016

(87) PCT Pub. No.: WO2015/125535
PCT Pub. Date: Aug. 27, 2015

(65) Prior Publication Data
US 2017/0009501 A1    Jan. 12, 2017

(30) Foreign Application Priority Data

Feb. 24, 2014  (JP) ................................ 2014-033087

(51) Int. Cl.
*E05B 65/06* (2006.01)
*E05C 9/02* (2006.01)
(Continued)

(52) U.S. Cl.
CPC .............. *E05C 9/026* (2013.01); *E05B 63/12* (2013.01); *E05B 65/00* (2013.01); *E05B 65/02* (2013.01);
(Continued)

(58) Field of Classification Search
CPC .......... E05C 9/026; E05C 9/1858; E05C 7/04; E05C 9/22; E05C 9/1883; E05B 65/06;
(Continued)

(56) References Cited

U.S. PATENT DOCUMENTS 1,294,949 A * 2/1919 Roberts ................... E05B 63/14
70/100
4,643,005 A * 2/1987 Logas ..................... E05C 9/026
292/20
(Continued)

FOREIGN PATENT DOCUMENTS

CN    102206971 A    10/2011
CN    102864995 A    1/2013
(Continued)

OTHER PUBLICATIONS

International Search Report of PCT/JP2015/051430, dated Mar. 3, 2015. [PCT/ISA/210].
(Continued)

*Primary Examiner* — Lloyd Gall
(74) *Attorney, Agent, or Firm* — Sughrue Mion, PLLC

(57) ABSTRACT

A door locking device is applied to an electronic apparatus including a hinged door arranged in an opening portion of a casing. The door locking device includes a key cylinder and a pivot hook. When the door is closed and a movable element of the key cylinder is at a locked position, the pivot hook is caught on the casing to prevent the door from being opened. The door locking device further includes a rod member crank-coupled to the movable element of the key cylinder on an inner side of the door and configured to be displaced by interlocking with the movable element. When the door is closed and the movable element is at the locked position, a distal end (roller) of the rod member is held in
(Continued)

contact with a rod receiving surface formed in the casing. Thus, the rod member keeps a closed state of the door.

6 Claims, 14 Drawing Sheets

(51) Int. Cl.

| | | |
|---|---|---|
| E05B 65/02 | (2006.01) | |
| G07F 9/10 | (2006.01) | |
| G07F 15/00 | (2006.01) | |
| E05B 63/12 | (2006.01) | |
| E05C 9/18 | (2006.01) | |
| E05C 9/22 | (2006.01) | |
| E05B 65/00 | (2006.01) | |
| E05C 7/04 | (2006.01) | |
| H05K 5/02 | (2006.01) | |
| G06Q 20/20 | (2012.01) | |

(52) U.S. Cl.
CPC ............... *E05B 65/06* (2013.01); *E05C 7/04* (2013.01); *E05C 9/1858* (2013.01); *E05C 9/1883* (2013.01); *E05C 9/22* (2013.01); *G07F 9/10* (2013.01); *G07F 15/00* (2013.01); *H05K 5/0208* (2013.01); *H05K 5/0221* (2013.01); *G06Q 20/209* (2013.01)

(58) Field of Classification Search
CPC .......... E05B 65/02; E05B 63/12; E05B 65/00; H05K 5/0221; H05K 5/0208; G06Q 20/209; G07F 15/00; G07F 9/10; Y10T 70/5261; Y10T 70/5208; Y10T 70/5212; Y10T 70/5217; Y10T 70/5124; Y10T 70/5248; Y10T 70/5279; Y10T 70/5292; Y10S 70/65

USPC ..... 70/116, DIG. 65, 84, 103–105, 113, 120, 70/123; 292/9, 73, 75, 15, 24, 25, 31, 292/193, DIG. 51; 109/67, 59 R, 59 T
See application file for complete search history.

(56) References Cited

U.S. PATENT DOCUMENTS

| | | | | |
|---|---|---|---|---|
| 5,490,606 | A * | 2/1996 | Lombardo | B65F 1/004 220/324 |
| 6,086,121 | A * | 7/2000 | Buckland | E05C 9/043 292/161 |
| 7,155,863 | B2 * | 1/2007 | Daniel | B60J 1/1853 292/DIG. 6 |
| 8,876,173 | B2 * | 11/2014 | Igarashi | E05F 11/02 206/710 |

FOREIGN PATENT DOCUMENTS

| | | | |
|---|---|---|---|
| CN | 202899832 U | | 4/2013 |
| JP | 55-022133 | * | 5/1980 |
| JP | 62-038371 | * | 3/1987 |
| JP | 2-89168 U | | 7/1990 |
| JP | 2-128765 U | | 10/1990 |
| JP | 05-295939 | * | 11/1993 |
| JP | 9-189164 A | | 7/1997 |
| JP | 11-347225 A | | 12/1999 |
| JP | 2009-035911 | * | 2/2009 |
| JP | 2011-26893 A | | 2/2011 |

OTHER PUBLICATIONS

Written Opinion of PCT/JP2015/051430, dated Mar. 3, 2015. [PCT/ISA/237].
Communication dated Mar. 21, 2017, from the State Intellectual Property Office of People's Republic of China in counterpart Application No. 201580009080.X.

* cited by examiner

FIG. 6A
(a)
<UNLOCKED STATE>
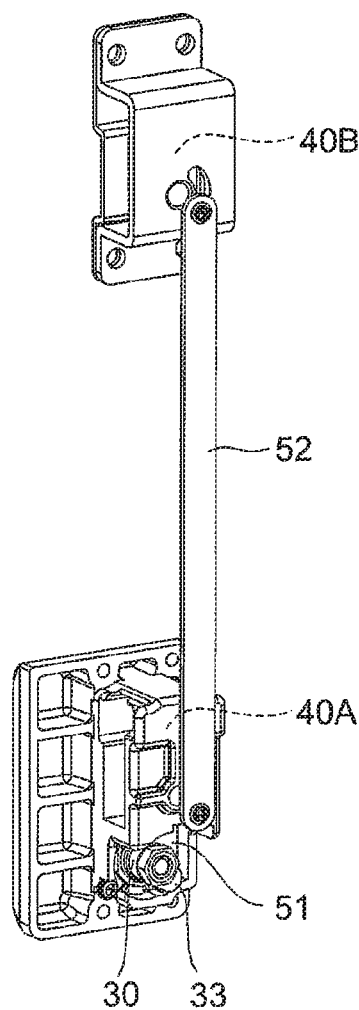
FIG. 6B
(b)
<LOCKED STATE>
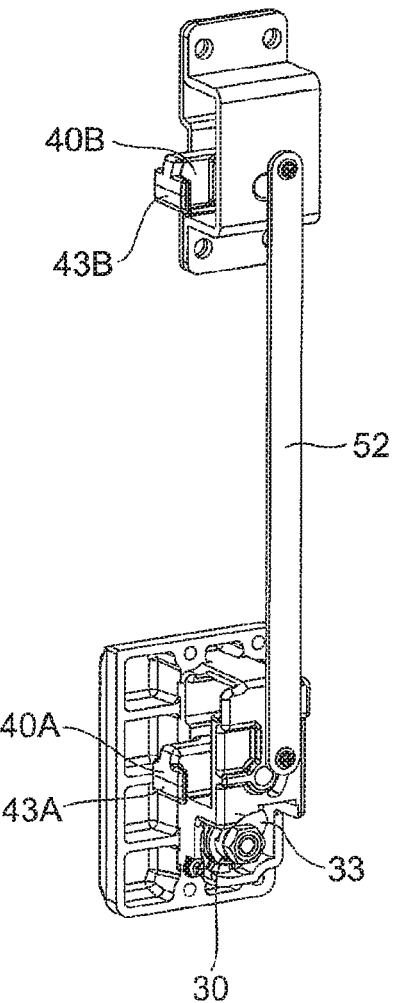
FIG. 6

(a) <BEFORE LOCKING>

(b) <BEFORE LOCKING>

(c) <LOCKED STATE>

(d) <LOCKED STATE>

(c) <LOCKED STATE>

(d) <LOCKED STATE>

(a) <UNLOCKED STATE>

(b) <UNLOCKED STATE>

(a)

(b)

CASING DEVICE AND ELECTRONIC APPARATUS

CROSS REFERENCE TO RELATED APPLICATIONS

This application is a National Stage of International Application No. PCT/JP2015/051430 filed Jan. 14, 2015, claiming priority based on Japanese Patent Application No. 2014-033087, filed Feb. 24, 2014, the contents of all of which are incorporated herein by reference in their entirety.

TECHNICAL FIELD

This invention relates to a door locking device configured to lock a door, which is applied to an electronic apparatus including a hinged door arranged in an opening portion of a casing.

BACKGROUND ART

As an electronic apparatus including a hinged door that is arranged in an opening portion of a casing and needs to be locked, there is exemplified an apparatus called an outdoor apparatus serving as an apparatus constructing a system for a self-service gas station. The outdoor apparatus is used, for example, to specify fueling conditions and a payment method for a fueling bill, and to pay the fueling bill.

In general, the outdoor apparatus is used under a state in which the casing of the outdoor apparatus is accommodated in a dedicated rack placed in the self-service gas station. A top surface, a bottom surface, right and left side surfaces, and a rear surface of the casing of the outdoor apparatus are surrounded by wall surfaces of the rack, whereas a front surface (front) thereof is exposed from the rack. In the casing, there are accommodated electronic apparatus, such as a bill handling apparatus, a printer for printing a receipt, and a card reader apparatus. Meanwhile, on the front surface of the casing, there is arranged a single-hinged door or a set of double doors (double-hinged doors) capable of being locked by door locking means. A touch-panel display, a slot for cash, such as paper money, and an issuing slot for a receipt are arranged in the door. The door locking means is further arranged in the door, and the door is opened in such a manner that a person who is allowed to open the door, such as an attendant of the self-service gas station, unlocks the door locking means. This configuration allows the person to access an inside of the outdoor apparatus so that the person can replenish sheets for the receipt, collect cash stored in the casing, and maintain and repair the outdoor apparatus.

As the door locking means of the outdoor apparatus, there is employed locking performed in such a manner that, on a pivot end side of the door, that is, at a position where, in a case of double doors, right and left doors are brought into abutment on each other when the doors are closed, or at a position where, in a case of a single-hinged door, a pivot end side of the door and an opening side of the casing are brought into abutment on each other when the door is closed, holes are formed to pass through both the members brought into abutment on each other, or a projection with a hole is formed in both the members brought into abutment on each other, and then a bolt (also called a shackle, a hook, or the like) of a padlock is inserted into the holes of both the members.

Incidentally, cash, such as paper money, is stored in the casing of the outdoor apparatus for conducting payment. Accordingly, such a crime may occur that the door is wrenched open using a crowbar or the like in order to steal cash stored in the outdoor apparatus. As described above, the casing of the outdoor apparatus is accommodated in the dedicated rack, and the rack normally has sufficient strength capable of resisting an action of wrenching the door open using a crowbar or the like. Accordingly, against the action of wrenching the door open using a crowbar or the like, it is unnecessary to take measures for the top surface, the bottom surface, the right and left side surfaces, and the rear surface of the casing of the outdoor apparatus, which are surrounded by the wall surfaces of the rack.

However, the door on the front surface of the casing is exposed from the rack, and hence it is necessary to take measures for the door on the front surface against the action of wrenching the door open using a crowbar or the like. The outdoor apparatus has such structure that it is difficult to take out cash stored in the casing unless the door is opened even if a part of the door is broken. Accordingly, in order to ensure crime prevention, it is only necessary to take measures to prevent the door from being opened.

A type of the door locking device configured to lock the hinged door of the electronic apparatus is disclosed in, for example, Patent Document 1. However, the locking device disclosed in Patent Document 1 is intended to be applied to a game machine, such as a pachinko machine, placed in a pachinko parlor where an attendant can keep an eye on a crime. Thus, no measures are taken against the action of wrenching the door open using a crowbar or the like.

PRIOR ART DOCUMENT(S)

Patent Document(s)

Patent Document 1: JP-A-H11-347225

DISCLOSURE OF THE INVENTION

Problem to be Solved by the Invention

Incidentally, in the door locking device, the bolt or the like is a movable member, and hence usually has a clearance. Further, the door itself is also a movable member, and hence has a clearance similarly. Even under a state in which the door is closed and locked, because of the clearance, a clearance is defined between the casing and the door, and the door inevitably has a certain backlash in a direction of opening the door.

The clearance and the backlash of the door may lead to intrusion of foreign matters into the casing. This is not preferred in view of the fact that the electronic apparatus, such as the bill handling apparatus, the printer for printing a receipt, and the card reader apparatus are accommodated in the casing. In particular, an outdoor-use electronic apparatus, such as the outdoor apparatus constructing a system for a self-service gas station, has a higher risk in that rainwater and dust may intrude into the casing than an indoor-use electronic apparatus. Thus, measures against the intrusion are desired.

Accordingly, it is an object of this invention to provide a door locking device excellent in crime prevention, and also excellent in waterproofness and dustproofness.

Solution to Problem

According to one embodiment of this invention, there is provided a door locking device configured to lock a hinged door, which is applied to an electronic apparatus including the hinged door arranged in an opening portion of a casing, the door locking device including: a key cylinder arranged on the hinged door, the key cylinder including a movable element arranged on an inner side of the hinged door and configured to be displaced in a pivoting manner between an unlocked position and a locked position in accordance with unlocking/locking operation; a pivot hook coupled to the movable element of the key cylinder on the inner side of the hinged door and configured to be displaced in a pivoting manner by interlocking with the movable element, the pivot hook being caught on the casing when the hinged door is closed and the movable element is at the locked position to prevent the hinged door from being opened; and a rod member crank-coupled to the movable element of the key cylinder on the inner side of the hinged door and configured to be linearly displaced by interlocking with the movable element, in which, when the hinged door is closed and the movable element is at the locked position, a distal end of the rod member is held in contact with a rod receiving surface formed in the casing to face in a direction of closing the hinged door so that the rod member keeps a closed state of the hinged door.

The rod member may include a roller arranged at the distal end of the rod member. The rod receiving surface of the casing may include an inclined portion configured to guide arrival of the roller. When the hinged door is closed and the movable element is at the locked position, the roller guided on the inclined portion may be held in contact with the rod receiving surface so that the rod member keeps the closed state of the hinged door.

Further, the door locking device may further include a crescent member coupled to the movable element of the key cylinder on the inner side of the hinged door and configured to be displaced in a pivoting manner by interlocking with the movable element. When the hinged door is closed and the movable element is at the locked position, a distal end of the crescent member may be held in contact with a crescent receiving surface formed in the casing to face in the direction of closing the hinged door so that the crescent member keeps the closed state of the hinged door together with the rod member.

Still further, the crescent member may include an inclined portion configured to guide arrival of the crescent member on the crescent receiving surface. When the hinged door is closed and the movable element is at the locked position, the inclined portion of the crescent member may be first brought into contact with the crescent receiving surface so that the crescent member keeps the closed state of the hinged door together with the rod member.

Still further, the door locking device may further include a urethane sheet or a rubber sheet bonded to a region of the casing with which the closed hinged door is to be held in contact.

Still further, the electronic apparatus may further include a second door forming a set of double doors together with the hinged door being a first door. The first door may further include a flange portion that is formed so as to protrude from a first pivot end side of the first door, and is held in contact with and covers a second pivot end side of the second door when the first door and the second door are closed. The second door may be constructed such that the second door cannot be opened unless the first door is opened.

Still further, according to one embodiment of this invention, there is provided an electronic apparatus, including the door locking device, the casing, and the hinged door.

Effect of the Invention

The door locking device according to this invention is excellent in crime prevention, and is also excellent in waterproofness and dustproofness.

BRIEF DESCRIPTION OF THE DRAWING

FIGS. 6A and 6B shows views for illustrating the locking mechanism of the door locking device according to the first embodiment of this invention, in which FIG. 6A is an illustration of an unlocked state, and FIG. 6B is an illustration of a locked state.

FIGS. 7A, 7B, 7C and 7D shows views for illustrating operation of the locking mechanism of the door locking device according to the first embodiment of this invention, in which FIGS. 7A and 7B are illustrations of a state before locking, and FIGS. 7C and 7D are illustrations of the locked state.

FIGS. 8A, 8B, 8C and 8D shows rear views of the doors, for illustrating the operation of the locking mechanism of the door locking device according to the first embodiment of this invention, in which FIGS. 8A and 8B are illustrations of the unlocked state, and FIGS. 8C and 8D are illustrations of the locked state.

FIGS. 10A, 10B, 10C and 10D shows views for illustrating operation of the closed door keeping mechanism of the door locking device according to the first embodiment of this invention, in which FIGS. 10A and 10B are illustrations of the unlocked state, and FIGS. 10C and 10D are illustrations of the locked state.

FIGS. 11A and 11B shows perspective views for illustrating the closed door keeping mechanism of the door locking device according to the first embodiment of this invention, in which FIG. 11A is an illustration of the unlocked state, and FIG. 11B is an illustration of the locked state.

FIGS. 12A and 12B shows sectional views for illustrating a main part of the closed door keeping mechanism of the door locking device according to the first embodiment of this invention, in which FIG. 12A is an illustration of the unlocked state, and FIG. 12B is an illustration of the locked state.

FIGS. 13A and 13B shows perspective views for illustrating the main part of the closed door keeping mechanism of the door locking device according to the first embodiment of this invention, in which FIG. 13A is an illustration of the unlocked state, and FIG. 13B is an illustration of the locked state.

MODES FOR EMBODYING THE INVENTION

Figure 1:
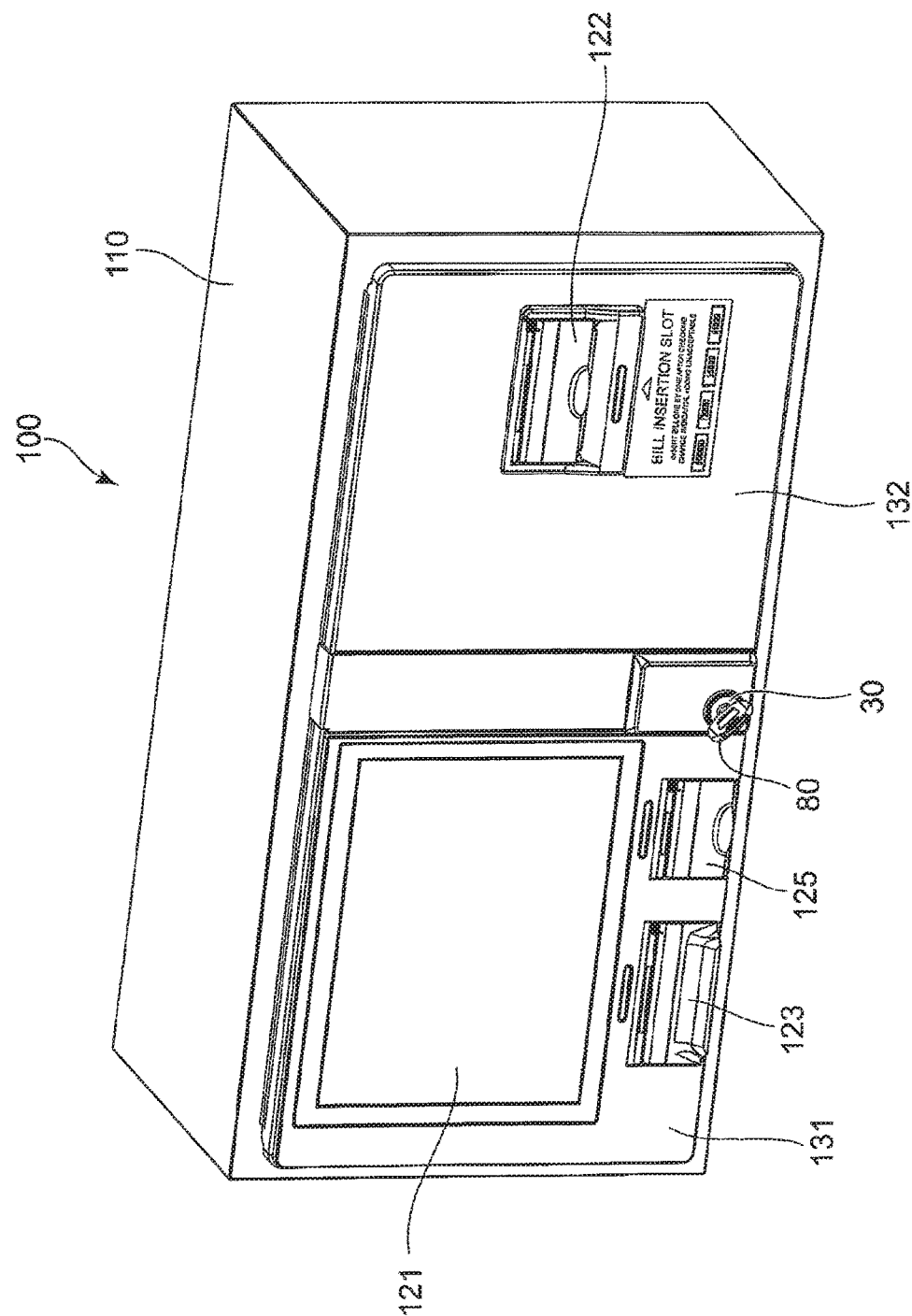
FIG. 1 is a perspective view for illustrating an outdoor apparatus including a door locking device according to a first embodiment of this invention.

A door locking device according to this invention is a device configured to lock a door, which is applied to an electronic apparatus including a hinged door arranged in an opening portion of a casing.

The door locking device according to this invention includes a key cylinder, and a locking mechanism including a pivot hook. The key cylinder is mounted to the door, and includes a movable element arranged on an inner side of the door, which is configured to be displaced in a pivoting manner between an unlocked position and a locked position in accordance with unlocking/locking operation. The pivot hook is coupled to the movable element of the key cylinder on the inner side of the door, and is displaced in a pivoting manner by interlocking with the movable element. When the door is closed and the movable element is at the locked position, the pivot hook is caught on the casing directly or indirectly, thereby preventing the door from being opened.

In particular, the door locking device according to this invention further includes a closed door keeping mechanism including a rod member. On the inner side of the door, the rod member is crank-coupled to the movable element of the key cylinder, and is displaced linearly by interlocking with the movable element. Further, when the door is closed and the movable element is at the locked position, a distal end of the rod member is held in contact with a rod receiving surface formed in the casing to face in a direction of closing the door. Thus, the rod member keeps a closed state (closed posture or closed position) of the door.

With the above-mentioned configuration, in the door locking device according to this invention, even if the locking mechanism including the pivot hook, and the door itself each have a clearance, even displacement of the door in a direction of opening the door, that is, opening of the door to a degree of the above-mentioned clearance is restrained because the distal end of the rod member is held in contact with the rod receiving surface facing to the direction of closing the door when the door is closed and the movable element is at the locked position. That is, the closed state of the door within the casing is reliably kept. Therefore, an unnecessary clearance is not defined between the casing and the door when the door is closed, and electronic apparatus, such as a bill handling apparatus, a printer for printing a receipt, and a card reader apparatus accommodated in the casing are protected from foreign matters, such as moisture and dust. That is, the door locking device according to this invention is excellent in waterproofness and dustproofness.

Further, in the door locking device according to this invention, the rod member of the closed door keeping mechanism also exerts a locking function. Accordingly, if a crowbar is inserted into a clearance defined beside the pivot end side of the door, owing to the locking function exerted by both the pivot hook of the locking mechanism and the rod member of the closed door keeping mechanism, it is difficult to wrench the door open so as to tear up the door using leverage exerted by the crowbar, and a period of time needed for someone to wrench the door open is increased. Thus, this invention is more excellent in crime prevention than a locking device including only the locking mechanism including the pivot hook.

First Embodiment

Now, a door locking device according to a first embodiment of this invention is described. First, after description is made of an outdoor apparatus to which the door locking device according to this embodiment is applied, and which is an apparatus constructing a system for a self-service gas station, a locking mechanism including pivot hooks, and a closed door keeping mechanism including a rod member and a crescent member are described.

[Outdoor Apparatus]

Figure 2A:
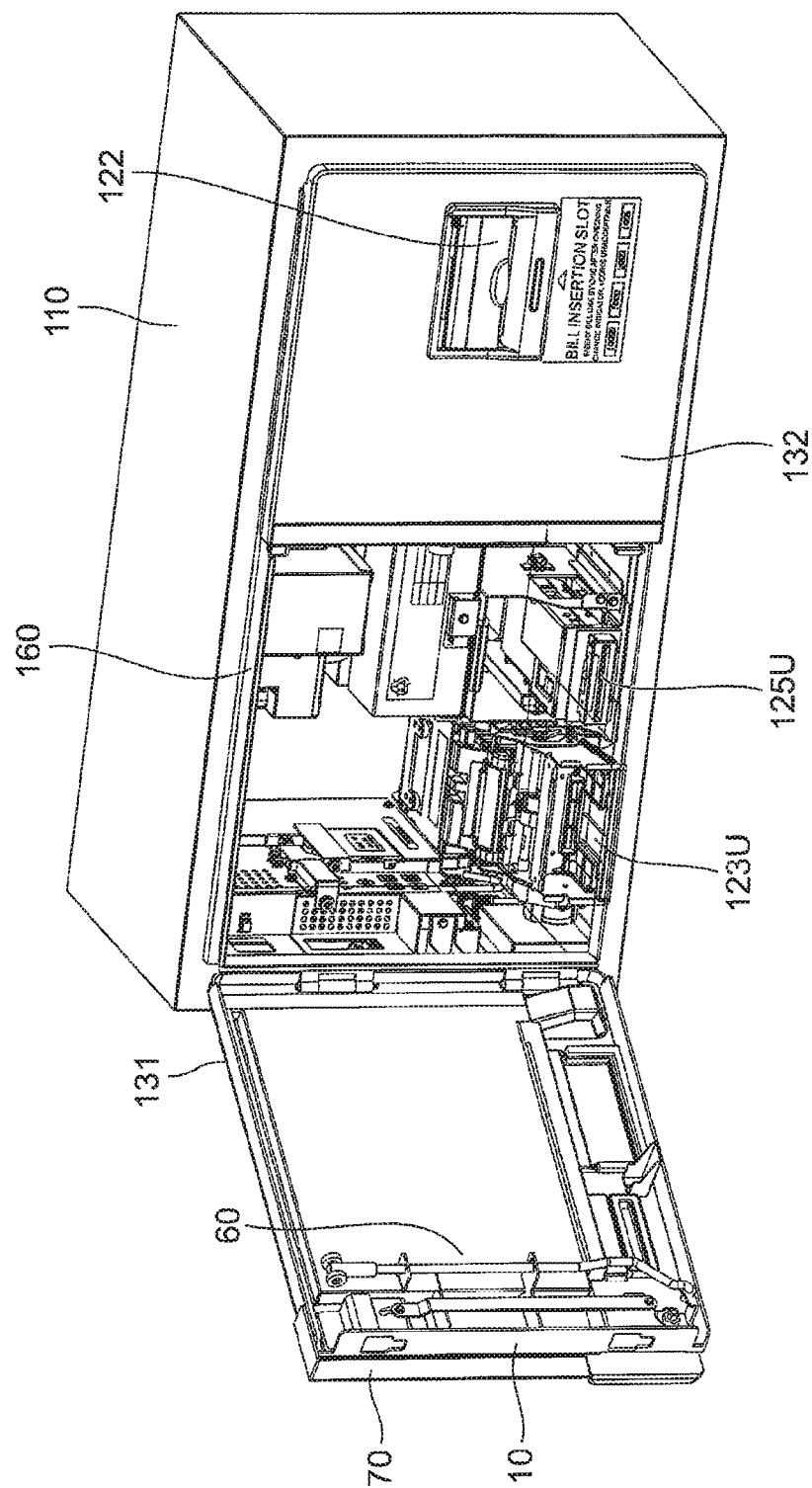
FIG. 2A is a perspective view for illustrating a state in which a left door of the outdoor apparatus illustrated in FIG. 1 is opened.
Figure 2B:
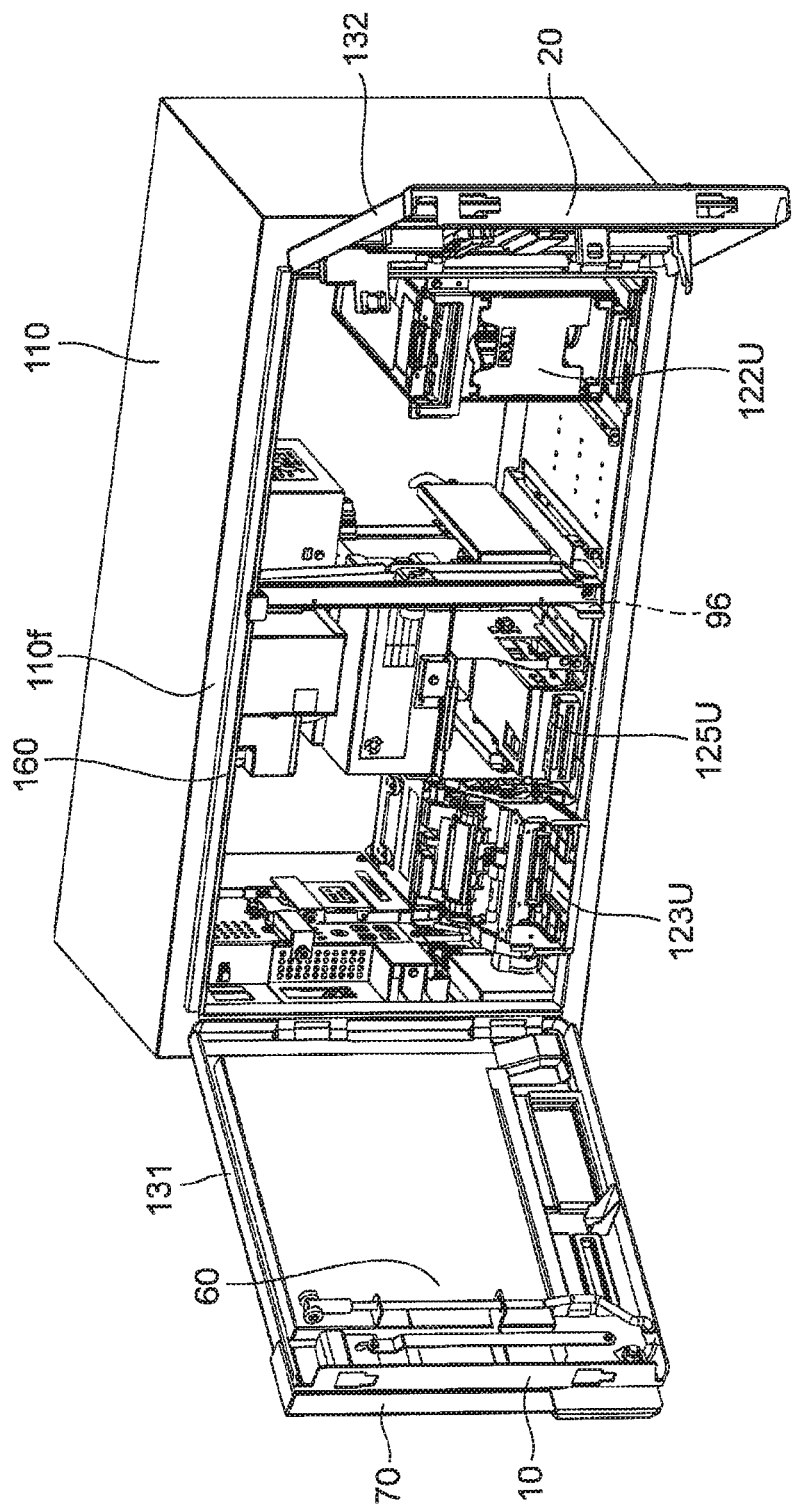
FIG. 2B is a perspective view for illustrating a state in which a right door and the left door of the outdoor apparatus illustrated in FIG. 1 are opened.

With reference to FIG. 1, FIG. 2A, and FIG. 2B, the door locking device according to the first embodiment of this invention includes a hinged door arranged in an opening portion of a casing. As an electronic apparatus including the door that needs to be locked, there is exemplified an outdoor apparatus 100 serving as an apparatus constructing a system for a self-service gas station. The outdoor apparatus is used, for example, to specify fueling conditions and a payment method for a fueling bill, and to pay the fueling bill.

The outdoor apparatus 100 is used under a state in which a casing 110 of the outdoor apparatus 100 is accommodated in a dedicated rack (not shown) placed in the self-service gas station. Accordingly, a top surface, a bottom surface, a left side surface, a right side surface, and a rear surface of the casing 110 of the outdoor apparatus 100 are surrounded by firm wall surfaces of the rack. Meanwhile, a front surface (front) 110f is exposed from the rack.

On the front surface 110f of the casing 110, which is exposed from the rack, a hinged door 131 is arranged. In this embodiment, in particular, there is further arranged a door 132 being a second door and forming a set of double doors (double-hinged doors) together with the door 131 being a first door. The door 131 and the door 132 are manufactured by press working a metal with high viscosity, such as stainless steel or a plated steel sheet.

Electronic apparatus such as a bill handling apparatus 122U, a printer 123U for printing a receipt, and a card reader apparatus 125U are accommodated in the casing 110. Further, as illustrated in FIG. 1 and the like, in the door 131, there are arranged a touch-panel display 121, an issuing slot 123 for a receipt, and an insertion slot 125 for cards. A slot 122 for paper money is arranged in the door 132. In the door 131 or the door 132, a reader for a two-dimensional barcode printed on a receipt and the like, an insertion slot for cards different from the insertion slot 125 for cards, an interphone, a motion sensor, and the like may further be arranged.

[Locking Mechanism]

With reference to FIG. 1, FIG. 2A, FIG. 2B, and FIG. 3 to FIGS. 8A, 8B, 8C and 8D, the door locking device according to this embodiment includes a pivot end wall portion 10, an opposed wall portion 20, a key cylinder 30, and pivot hooks 40A and 40B. In FIGS. 7A, 7B, 7C and 7D, for easy understanding of description, illustrations of components configured to cover the pivot hooks 40A and 40B are omitted. Further, FIGS. 8A, 8B, 8C and 8D shows rear views of the doors, but the closed door keeping mechanism described later is not illustrated.

Figure 3:
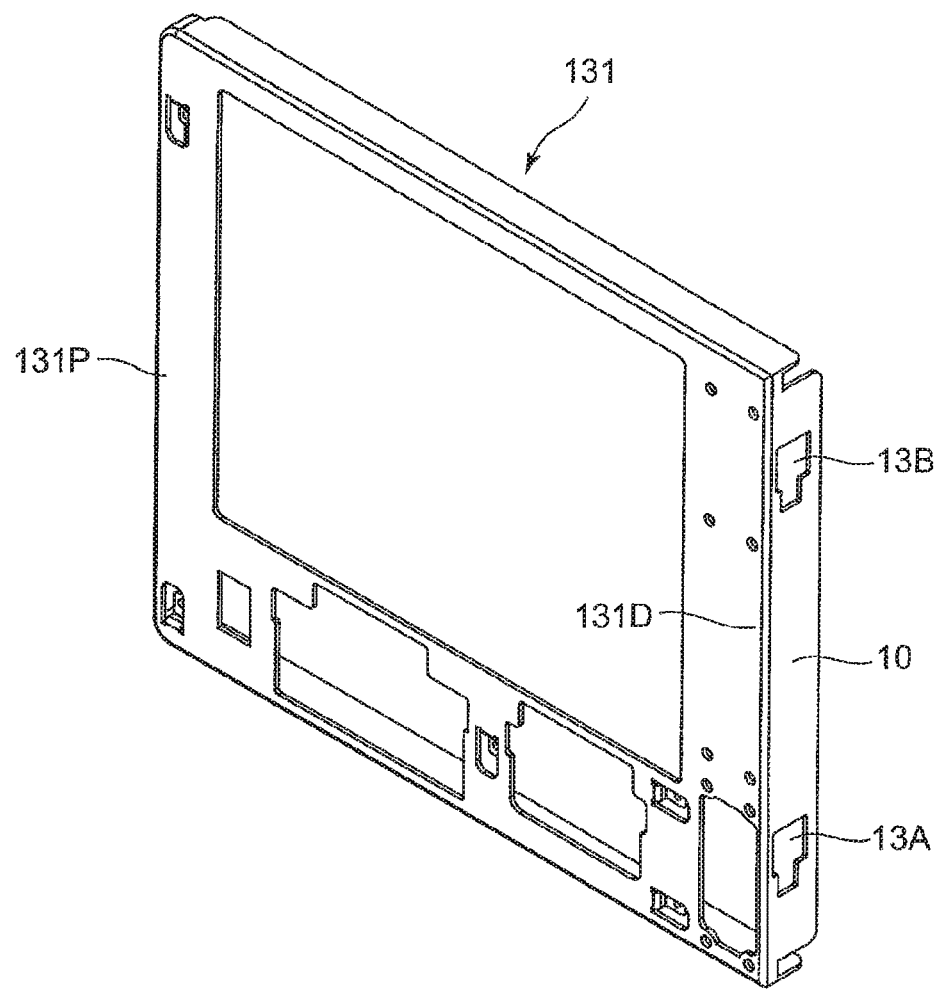
FIG. 3 is a perspective view for illustrating a door (first door) of the outdoor apparatus illustrated in FIG. 1.

As illustrated in FIG. 3 and the like, the pivot end wall portion 10 extends toward an inner side of the door 131 from a pivot end side 131D (FIG. 3) of the door 131, and has first through-holes 13A and 13B formed therein. The plurality of first through-holes 13A and 13B are formed in line along the pivot end side 131D. Reference symbol 131P in FIG. 3 denotes a pivot base side of the door 131. The pivot base side 131P is pivotably supported in the opening portion of the front surface 110f of the casing 110 to form a hinge mechanism. With this configuration, the door 131 can be opened and closed as a hinged door.

Figure 4:
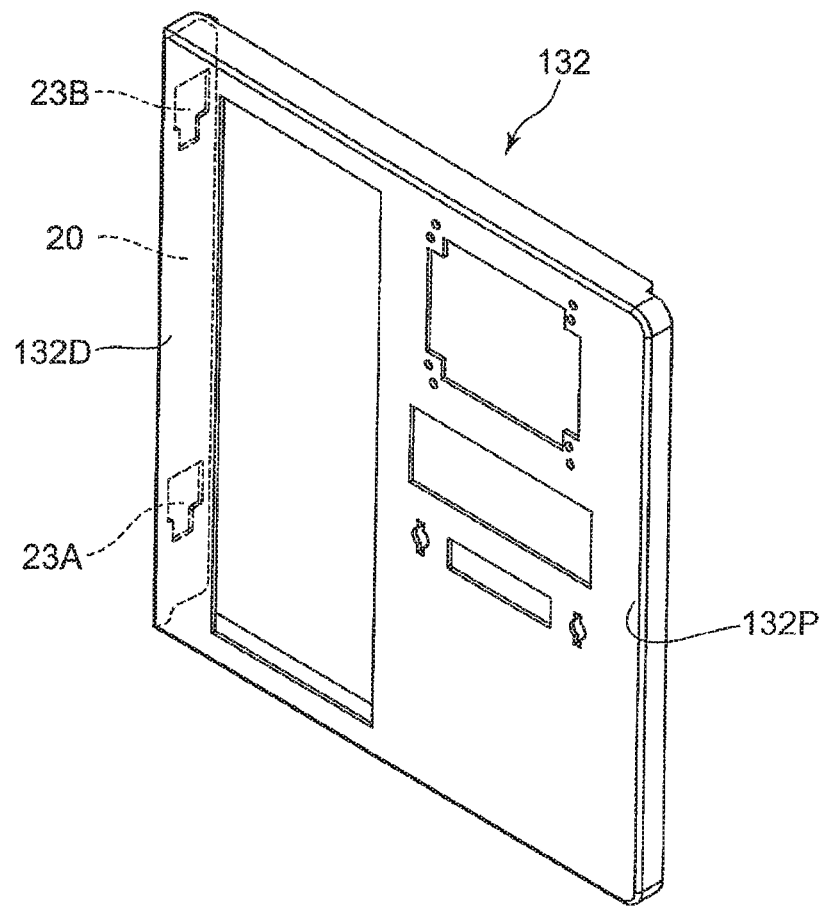
FIG. 4 is a perspective view for illustrating a second door of the outdoor apparatus illustrated in FIG. 1.
Figure 5:
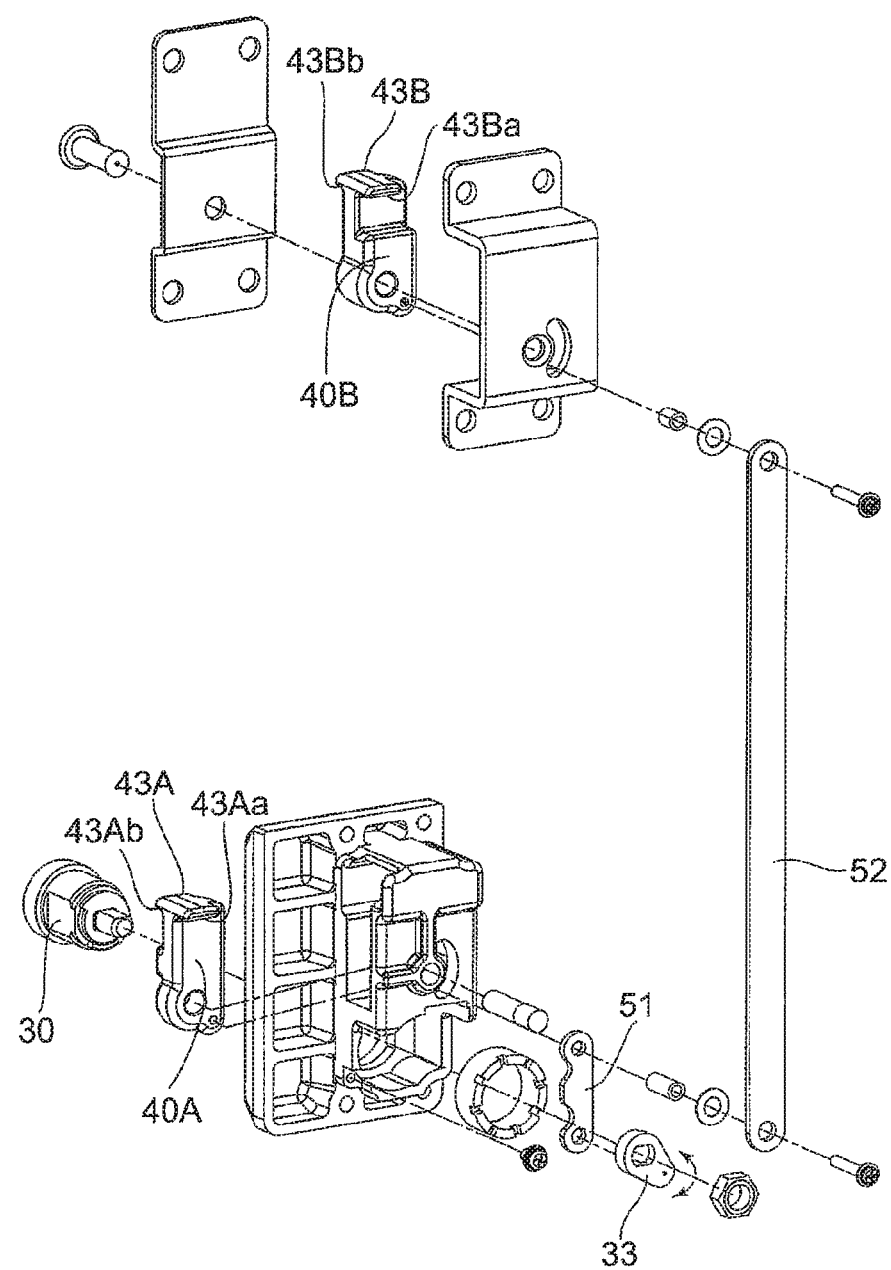
FIG. 5 is an exploded perspective view for illustrating a locking mechanism of the door locking device according to the first embodiment of this invention.
Figure 7A:
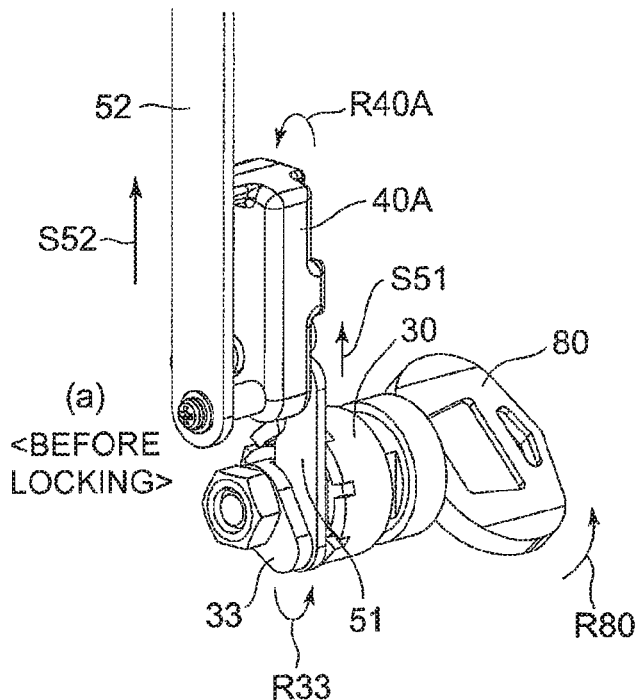
Figure 7B:
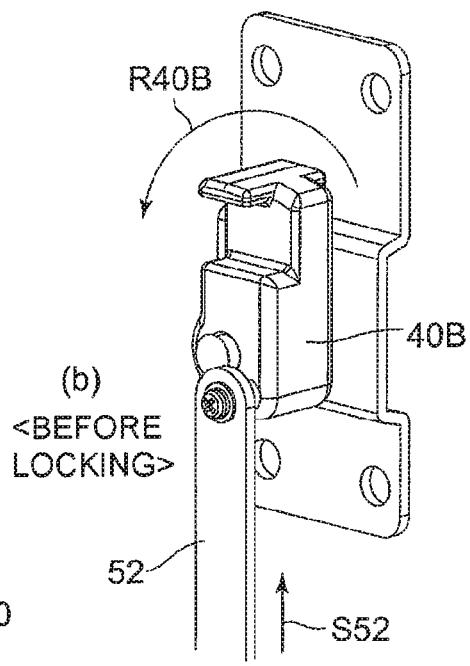
Figure 7C:
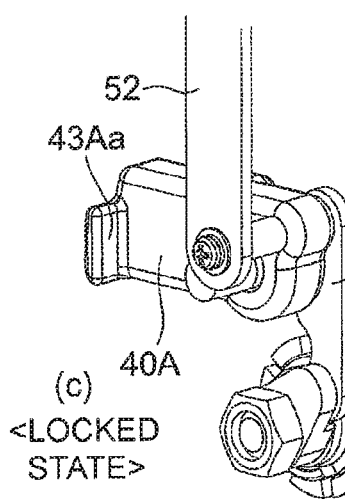
Figure 7D:
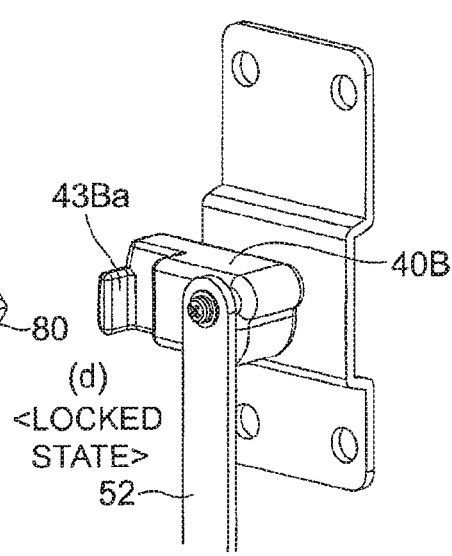
Figure 8C:
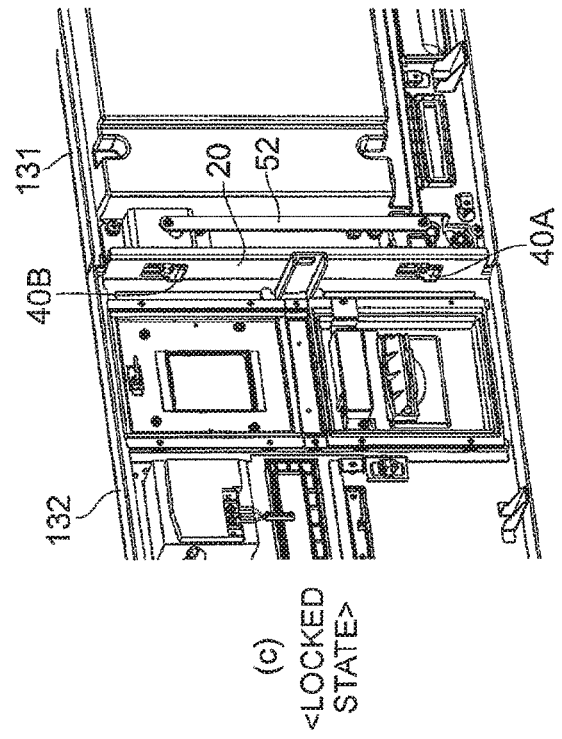
Figure 8D:
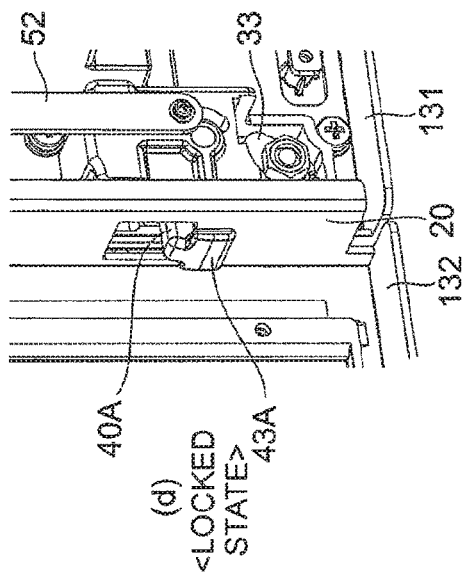
Figure 8A:
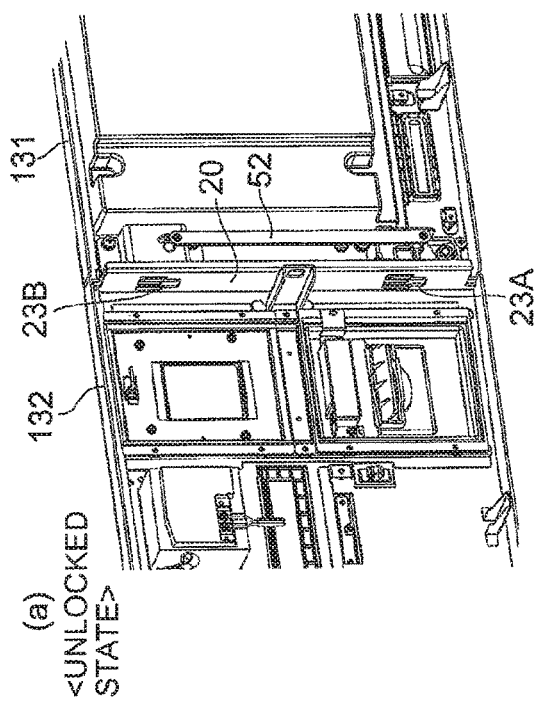
Figure 8B:
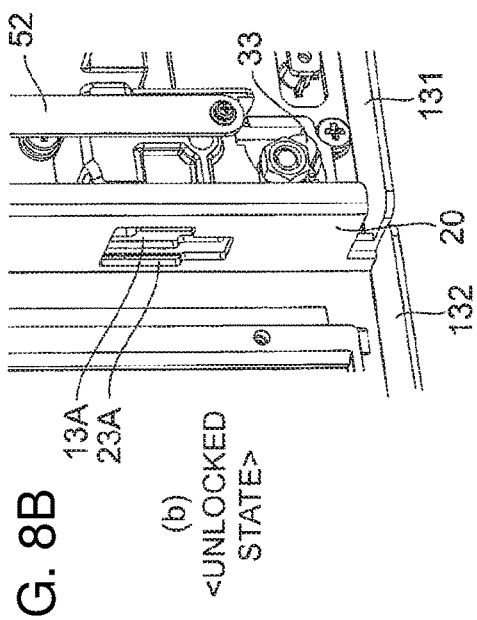

As illustrated in FIG. 4 and the like, the opposed wall portion 20 is opposed to the pivot end wall portion 10 when the door 131 is closed, and the opposed wall portion 20 has second through-holes 23A and 23B formed therein correspondingly to the first through-holes 13A and 13B. In this embodiment, in particular, the opposed wall portion 20 extends toward an inner side of the door 132 from a pivot end side 132D of the door 132. The plurality of second through-holes 23A and 23B are formed in line along the pivot end side 132D correspondingly to the plurality of first through-holes 13A and 13B. Reference symbol 132P in FIG. 4 denotes a pivot base side of the door 132. The pivot base side 132P is pivotably supported in the opening portion of the front surface 110$f$ of the casing 110 to form a hinge mechanism. With this configuration, the door 132 can be opened and closed as a hinged door.

With reference to FIG. 5 to FIGS. 8A, 8B, 8C and 8D, the key cylinder 30 is fixed to the door 131 through intermediation of a plate member, and includes a movable element 33 arranged on the inner side of the door 131 and configured to be displaced in a pivoting manner between an unlocked position and a locked position in accordance with unlocking/locking operation performed with a key 80 on an outer side of the door 131.

The pivot hooks 40A and 40B each have a hook shape, and are mounted on the inner side of the door 131 so as to interlock with the movable element 33 of the key cylinder 30 through intermediation of link members 51 and 52. In FIGS. 7A, 7B, 7C and 7D, the arrow R80 indicates an operating direction of the key 80 when an unlocked state before locking is shifted to a locked state; the arrow R33, an operating direction of the movable element 33; the arrow S51, an operating direction of the link member 51; the arrow S52, an operating direction of the link member 52; the arrow R40A, an operating direction of the pivot hook 40A; and the arrow R40B, an operating direction of the pivot hook 40B.

The plate member configured to support the key cylinder 30, the link members 51 and 52, the pivot hooks 40A and 40B, and the like are manufactured by casting a metal with high viscosity, such as stainless steel.

In this invention, the number of the pivot hooks is not limited to two. One pivot hook or three or more pivot hooks may be prepared as needed.

When the movable element 33 is at the unlocked position (FIG. 6A, FIG. 7A and 7B, FIG. 8A and 8B), the pivot hooks 40A and 40B retreat to the inner side of the door 131 with respect to the first through-holes 13A and 13B of the pivot end wall portion 10.

On the other hand, when the movable element 33 is at the locked position (FIG. 6B, FIG. 7C and 7D, FIG. 8C and 8D), the pivot hooks 40A and 40B enter narrow portions of the second through-holes 23A and 23B of the opposed wall portion 20 through the first through-holes 13A and 13B of the pivot end wall portion 10, thereby preventing (prohibiting) the door 131 and the door 132 from being opened. At this time, the pivot hooks 40A and 40B firmly keep the pivot end wall portion 10 of the closed door 131 and the opposed wall portion 20 of the closed door 132 overlapping each other. In particular, in this embodiment, the pivot hook 40A includes a retaining flange portion 43A having retaining surfaces 43Aa and 43Ab that are positioned in parallel to a wall surface of the opposed wall portion 20 on a side opposite to the pivot end wall portion 10 when the pivot hook 40A enters the second through-hole 23A of the opposed wall portion 20 through the first through-hole 13A, and the pivot hook 40B includes a retaining flange portion 43B having retaining surfaces 43Ba and 43Bb that are positioned in parallel to the wall surface of the opposed wall portion 20 on the side opposite to the pivot end wall portion 10 when the pivot hook 40B enters the second through-hole 23B of the opposed wall portion 20 through the first through-hole 13B. With this configuration, the pivot hooks 40A and 40B can be prevented from slipping off the opposed wall portion 20. Accordingly, the pivot hooks 40A and 40B further firmly keep the pivot end wall portion 10 and the opposed wall portion 20 overlapping each other against a force of cancelling the keeping. Under a locked state, the retaining surfaces 43Aa and 43Ab, and the retaining surfaces 43Ba and 43Bb are opposed to a back surface of the opposed wall portion 20 with a slight gap. Further, only any one of the retaining surfaces 43Aa and 43Ab of the retaining flange portion 43A may be formed, and only any one of the retaining surfaces 43Ba and 43Bb of the retaining flange portion 43B may be formed.

Even when the door 131 and the door 132 are closed, a slight clearance (for example, approximately 3 mm) is defined between the both doors (between the pivot end wall portion 10 and the opposed wall portion 20). The clearance is needed in order to ensure a margin for a clearance of each component, and to avoid collision between the pivot end sides at the time of pivot of the doors. However, a crowbar or the like may be inserted into the clearance. Therefore, the door locking device according to this invention further includes a flange portion 70 that is formed along an outer surface of the door 131 so as to protrude from the pivot end side 131D, and is configured to cover the clearance defined between the both doors (between the pivot end wall portion 10 and the opposed wall portion 20) when the doors are closed. The flange portion 70 is manufactured by casting a metal with high viscosity, such as stainless steel.

[Closed Door Keeping Mechanism]

As illustrated in FIG. 2A and FIG. 2B, the door locking device according to this embodiment includes, in addition to the above-mentioned locking mechanism including the pivot hooks, a closed door keeping mechanism 60 including a rod member and a crescent member.

Figure 9:
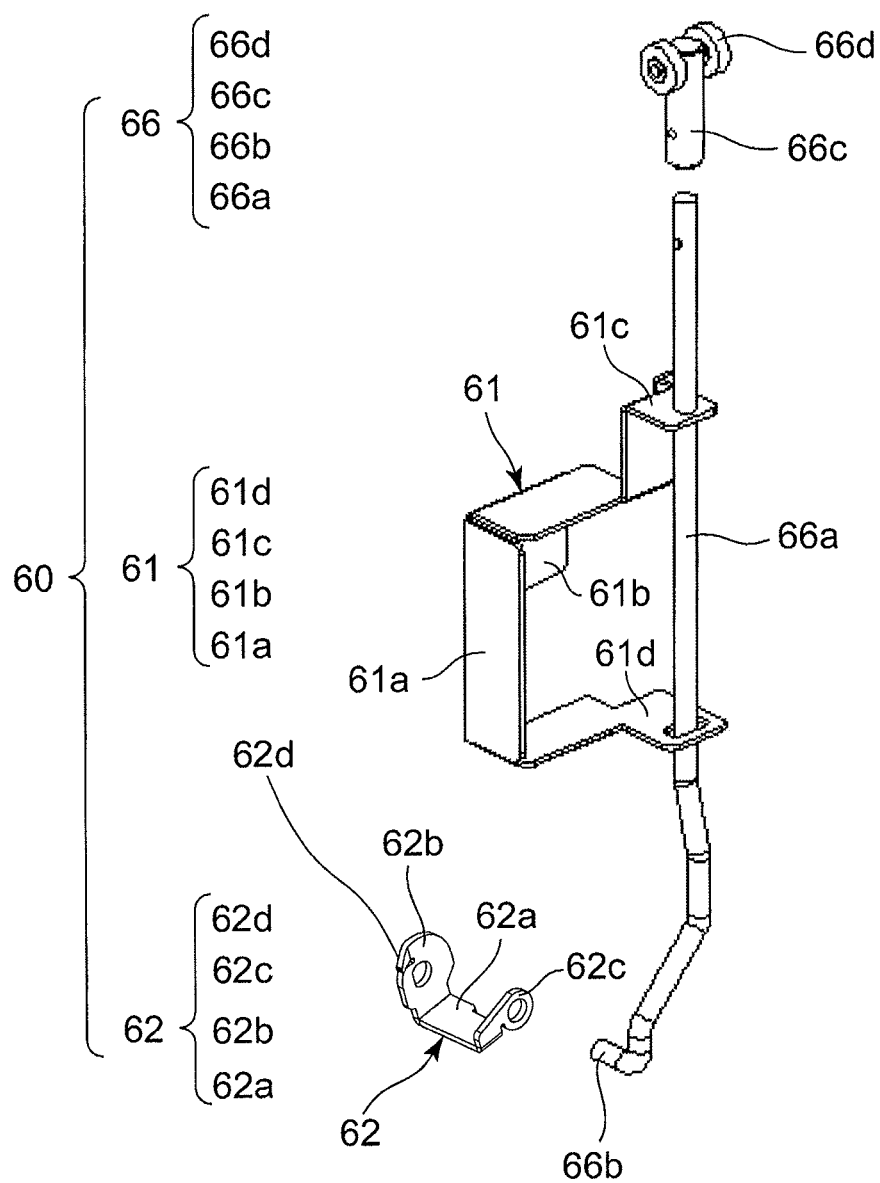
FIG. 9 is an exploded perspective view for illustrating a closed door keeping mechanism of the door locking device according to the first embodiment of this invention.
Figure 10:
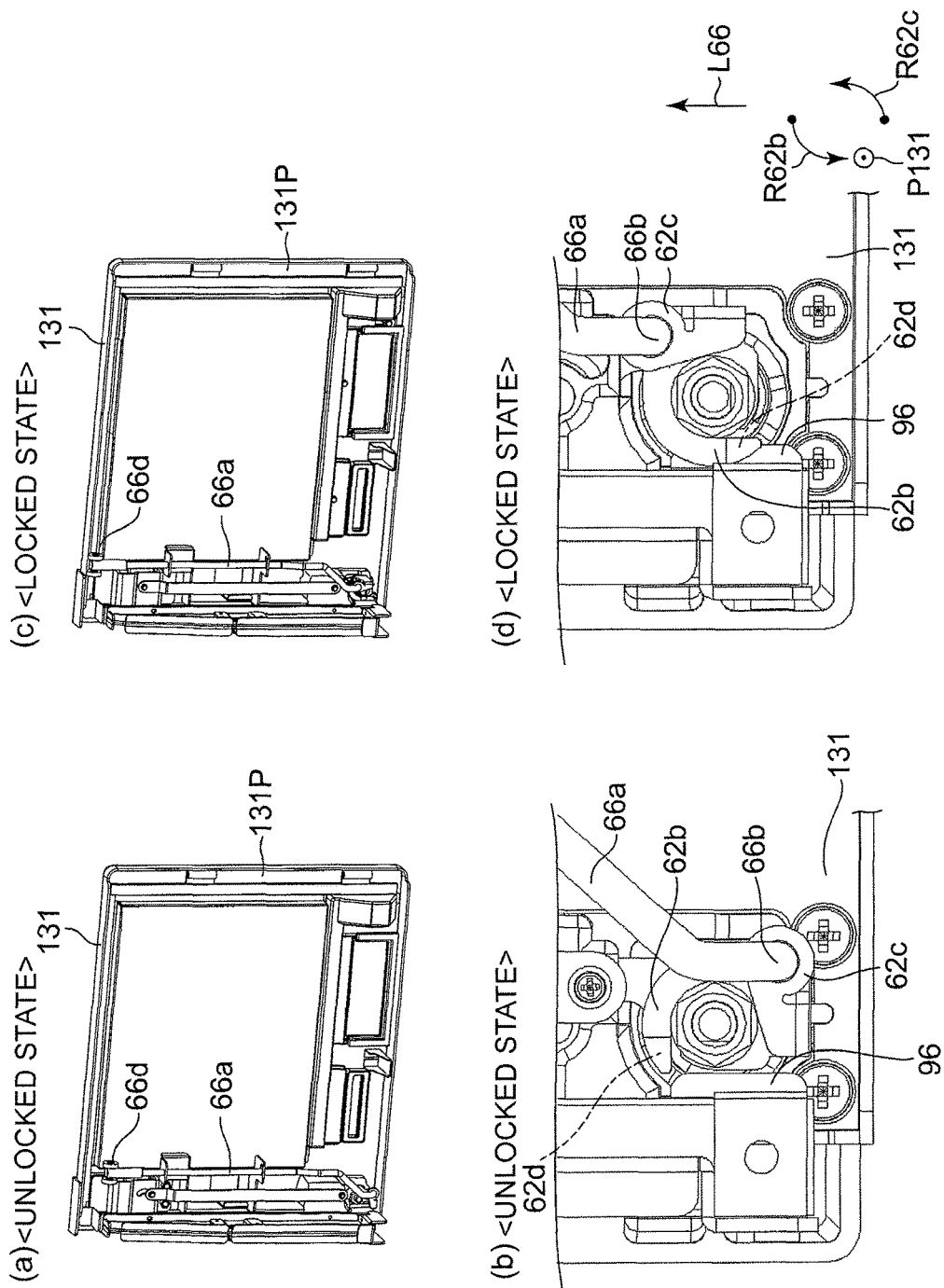

Also with reference to FIG. 9, FIG. 10A, 10B, 10C and 10D, FIG. 11A and 11B, FIG. 12A and 12B, the closed door keeping mechanism 60 of the door locking device according to this embodiment includes a support fitting 61 and a rod member 66. In FIG. 10D, the arrow R62$b$ indicates an operating direction of a crescent portion 62$b$ when an unlocked state before locking is shifted to a locked state; the arrow R62$c$, an operating direction of a crank portion 62$c$; and the arrow L66, an operating direction of the rod member 66. Further, in FIG. 11B, the arrow R30 indicates an operating direction of the movable element of the key cylinder 30 when the unlocked state before locking is shifted to the locked state; the arrow R62$c$, the operating direction of the crank portion 62$c$; and the arrow L66, the operating direction of the rod member 66. Further, in FIG. 12B, the arrow L66 indicates the operating direction of the rod member 66 when the unlocked state before locking is shifted to the locked state, and the arrow P131 indicates a direction of closing the door.

On the inner side of the door 131, the rod member 66 is crank-coupled to the movable element of the key cylinder 30 through intermediation of a crescent member 62 serving as a crank member, and is displaced linearly by interlocking with the movable element. Further, when the door 131 is closed and the movable element of the key cylinder 30 is at the locked position, a distal end of the rod member 66 is held in contact with a rod receiving surface 91 formed in the casing 110 to face in the direction of closing the door 131.

Thus, the rod member 66 keeps a closed state (closed posture or closed position) of the door 131.

As illustrated in FIG. 9, the rod member 66 includes a rod body 66a obtained by bending an elastic metal rod, such as stainless steel, an insert portion 66b formed at a lower end of the rod body 66a integrally with the rod body 66a, a metal cap portion 66c mounted to an upper end of the rod body 66a with a set screw, through insertion, or using a clip pin or the like, and two rollers 66d made of a metal or a resin and rotatably mounted to the cap portion 66c.

Figure 11:
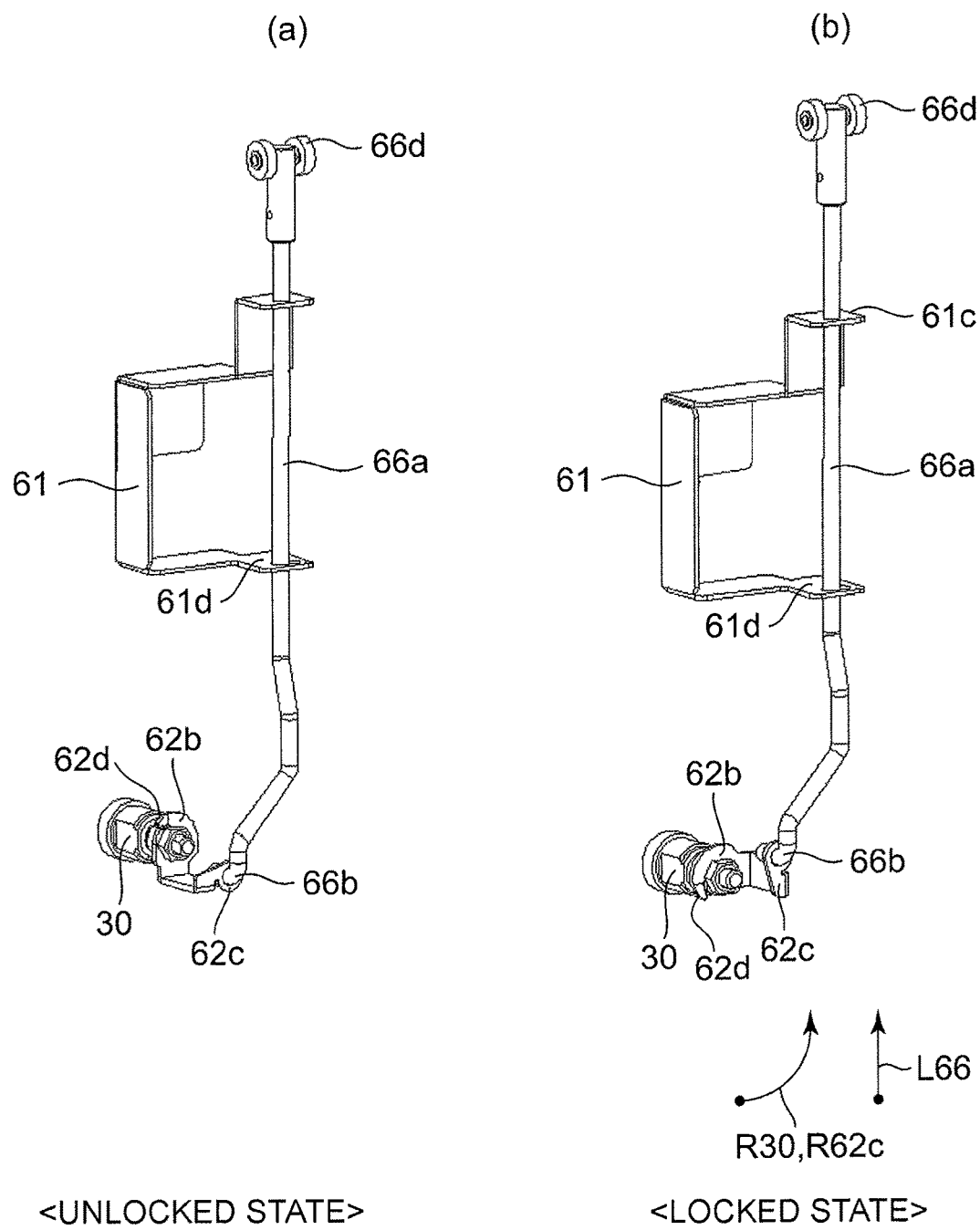

The rod member 66 is mounted to the door 131 through intermediation of the support fitting 61 illustrated in FIG. 9, FIG. 11A and 11B, so as to be capable of being linearly displaced in an up-and-down direction of the casing 110 and the door 131. The support fitting 61 is made of a metal, and includes a main portion 61a, a mount portion 61b to be mounted to the inner side of the door 131 by welding, screw fixation, or the like, and perforated tab portions 61c and 61d through which the rod body 66a of the rod member 66 is slidably inserted. A hole of each of the perforated tab portions 61c and 61d has such a dimension that almost no clearance is defined between the dimension of the hole and a diameter dimension of the rod body 66a in a depth direction of the casing 110 and the door 131.

Figure 12A:
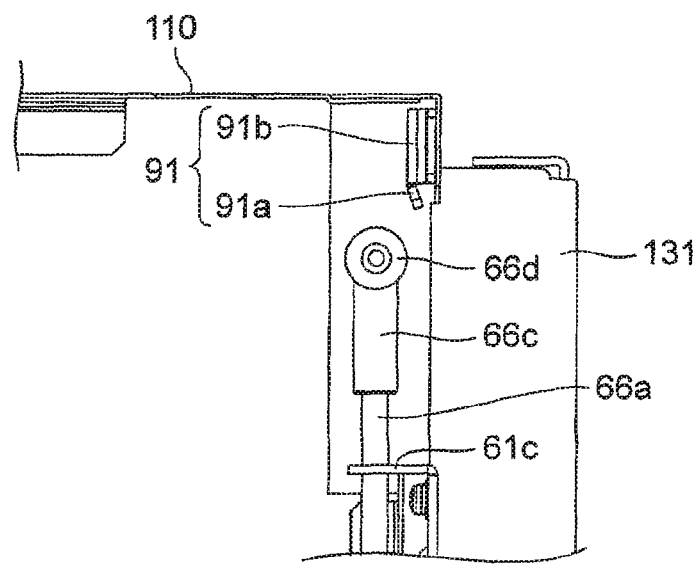
Figure 12B:
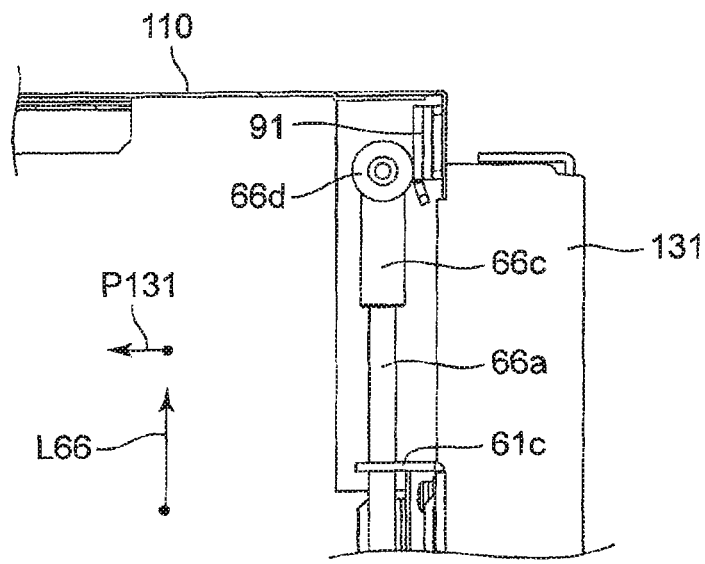

As illustrated in FIG. 12A and 12B, on an upper side of the opening portion of the casing 110, the rod receiving surface 91 is formed to face in the direction of closing the door 131. The rod receiving surface 91 includes an inclined portion 91a configured to guide arrival of the rollers 66d that are displaced (lifted up) from the lower side to the upper side of the figures when the unlocked state illustrated in FIG. 12A is shifted to the locked state illustrated in FIG. 12B, and includes a flat surface portion 91b formed continuously with the inclined portion 91a. Further, when the door 131 is closed and the movable element of the key cylinder 30 is at the locked position, the rollers 66d guided on the inclined portion 91a of the rod receiving surface 91 are held in contact with the flat surface portion 91b. Thus, the rod member 66 keeps the closed state (closed posture or closed position) of the door 131.

The closed door keeping mechanism 60 of the door locking device according to this embodiment further includes the crescent member 62.

As illustrated in FIG. 9, the crescent member 62 is coupled to the movable element of the key cylinder 30 on the inner side of the door 131, and is displaced in a pivoting manner by interlocking with the movable element. Further, when the door 131 is closed and the movable element of the key cylinder 30 is at the locked position, a distal end of the crescent member 62 is held in contact with a crescent receiving surface 96 formed in the casing 110 to face in the direction of closing the door 131. Thus, the crescent member 62 keeps the closed state (closed posture or closed position) of the door 131 together with the rod member 66.

Figure 13:
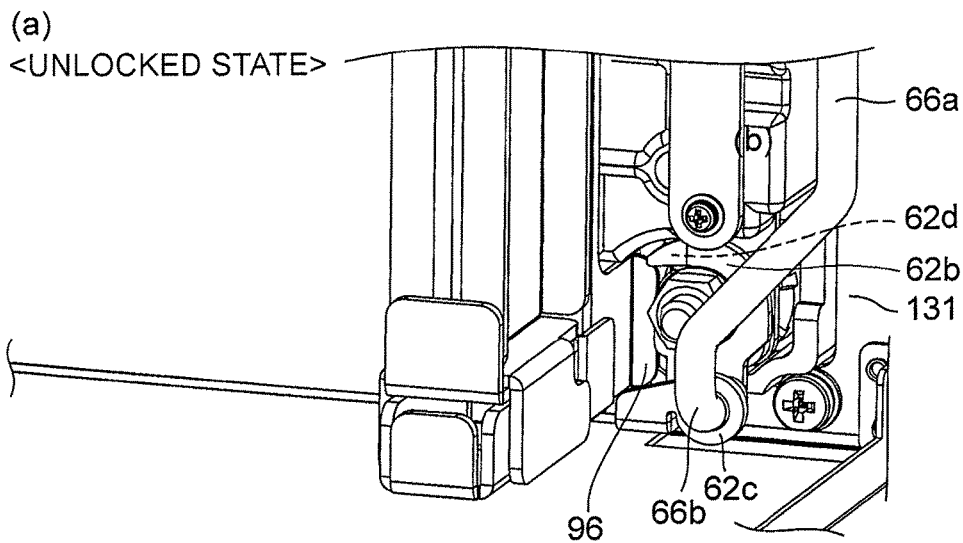
Figure 13:
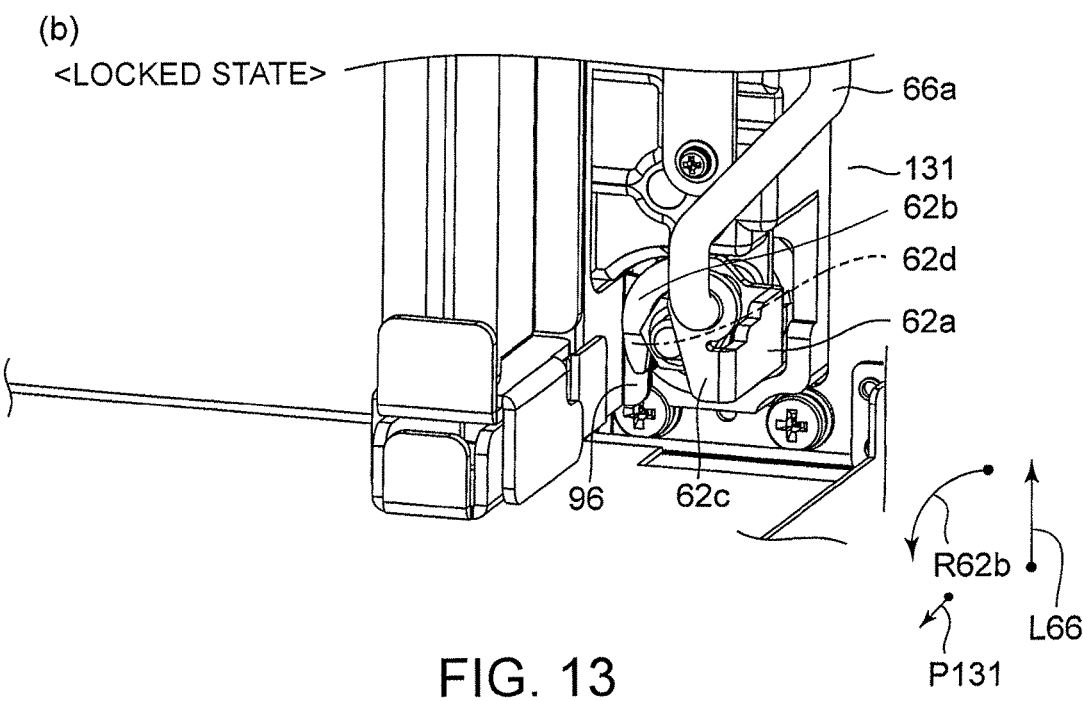

Meanwhile, as illustrated in FIG. 2B, FIG. 10B and 10D, FIG. 13A and 13B, on a lower side of the opening portion of the casing 110, the crescent receiving surface 96 is formed to face to the direction of closing the door 131. In FIG. 13B, the arrow R62b indicates the operating direction of the crescent portion 62b when the unlocked state before locking is shifted to the locked state; and the arrow L66, the operating direction of the rod member 66. Further, the arrow P131 indicates the direction of closing the door.

As illustrated in FIG. 9, the crescent member 62 is formed by subjecting an elastic metal material, such as stainless steel, to sheet metal processing, and includes a connection portion 62a, the crescent portion 62b having a circular arc hook shape, and the crank portion 62c serving as a crank member for the above-mentioned rod member 66. The insert portion 66b of the rod member 66 is inserted into a hole of the crank portion 62c. The crescent portion 62b of the crescent member 62 includes an inclined portion 62d configured to guide arrival of the crescent member 62 on the crescent receiving surface 96. Further, when the unlocked state illustrated in FIG. 10B and FIG. 13A is shifted to the locked state illustrated in FIG. 10D and FIG. 13B, the crescent portion 62b of the crescent member 62 is displaced (pivoted) counterclockwise from the twelve o'clock position to the nine o'clock position of the figures. At this time, the inclined portion 62d of the crescent portion 62b is first brought into contact with the crescent receiving surface 96. Thus, the crescent member 62 keeps the closed state (closed posture or closed position) of the door 131 together with the rod member 66.

Incidentally, as described in the column of the locking mechanism, the door 131 includes the flange portion 70. The flange portion 70 is formed so as to protrude from the first pivot end side of the door 131. The flange portion 70 is held in contact with and covers the second pivot end side of the door 132 when the door 131 and the door 132 are closed. Accordingly, the closed state of the door 131 is kept by the closed door keeping mechanism 60 so that the closed state of the door 132 is also kept.

In addition, in an upper part of the opening portion of the casing 110, a urethane sheet 160 is bonded to a region with which the closed doors 131 and 132 are to be held in contact. In this manner, even when the doors are closed, foreign matters, such as rainwater and dust, can be prevented from intruding into the casing 110 from a clearance inevitably defined between the casing 110 and the door 131 and between the casing 110 and the door 132. That is, waterproofness and dustproofness are enhanced as compared to a case where only the closed door keeping mechanism 60 is arranged. In this embodiment, the urethane sheet 160 is arranged in the upper part of the opening portion of the casing 110 that has a high risk of intrusion of foreign matters most of all. However, the urethane sheet may be arranged in a lower part and a side part of the opening portion of the casing 110, and between the pivot end side 131D (or the flange portion 70) of the door 131 and the pivot end side 132D of the door 132 that are held in abutment on each other when the doors are closed. Further, instead of the urethane sheet, a sheet made of a different material, such as a rubber sheet, may be arranged as long as the material can prevent intrusion of foreign matters, and has elasticity so as not to impair a clearance in the direction of closing the doors 131 and 132.

In this embodiment, the reason why the rollers 66d are arranged on the rod member 66, the reason why the inclined portion 91a is formed on the rod receiving surface 91, and the reason why the inclined portion 62d is formed at the distal end of the crescent portion 62b of the crescent member 62 are as follows.

Firstly, after the doors 131 and 132 are closed, operation of locking the key cylinder 30 is performed using the key 80. Thus, the locking mechanism including the pivot hooks is operated by interlocking with the movable element of the key cylinder 30, and the closed door keeping mechanism 60 is operated. In order to eliminate a backlash in a direction of opening the door, this invention is designed so that almost no clearance is set in a positional relationship in a depth direction of the casing 110 between the flat surface portion 91b of the rod receiving surface 91 and the rollers 66d of the rod member 66, and in a positional relationship in the depth direction of the casing 110 between the crescent receiving surface 96 and the crescent portion 62*b* of the crescent member 62. Accordingly, when the rollers 66*d* arrive onto the rod receiving surface 91, the rollers 66*d* may collide with (be caught on) the rod receiving surface 91. Further, when the crescent portion 62*b* of the crescent member 62 arrives onto the crescent receiving surface 96, the crescent portion 62*b* may collide with (be caught on) the crescent receiving surface 96. In order to take measures against this, in this invention, the rollers 66*d* are arranged on the rod member 66, and the inclined portions 91*a* and 62*d* are formed so as to respectively correspond to the rod member 66 and the crescent portion 62*b* of the crescent member 62. Thus, the rollers 66*d* are caused to gradually arrive onto the rod receiving surface 91, and the crescent portion 62*b* of the crescent member 62 is caused to gradually arrive onto the crescent receiving surface 96, thereby avoiding collision (being caught).

Secondly, a user needs to perform locking operation while gripping the key 80 being a relatively small gripped portion (having a relatively small distance factor of moment), thereby performing operation of the locking mechanism including the pivot hooks, and operation of the closed door keeping mechanism 60 including the rod member 66 and the crescent member 62. In particular, as described above, the closed door keeping mechanism 60 is designed so that almost no clearance is set in the positional relationship in the depth direction of the casing 110 between the flat surface portion 91*b* of the rod receiving surface 91 and the rollers 66*d* of the rod member 66, and in the positional relationship in the depth direction of the casing 110 between the crescent receiving surface 96 and the crescent portion 62*b* of the crescent member 62. Consequently, a relatively large frictional force is generated. Accordingly, when urging means, force multiplying means, or an electric-powered mechanism for assisting the operation is not arranged, a relatively large operating force is needed to overcome the above-mentioned frictional force. In order to take measures against this, the rollers 66*d* are arranged on the rod member 66, and the inclined portion is formed so as to correspond to each of the rod member 66 and the crescent portion 62*b* of the crescent member 62. Thus, the rollers 66*d* are caused to gradually arrive onto the rod receiving surface 91, and the crescent portion 62*b* of the crescent member 62 is caused to gradually arrive onto the crescent receiving surface 96. Consequently, a large operating force is not needed concentratedly. Even when the operating force having the same magnitude is finally needed, more excellent operability is obtained in a case where it is only necessary to gradually increase the operating force than a case where the operating force is needed concentratedly.

Second Embodiment

A door locking device according to a second embodiment of this invention is different from the door locking device according to the first embodiment in that the door locking device according to the second embodiment is applied to an electronic apparatus including a single-hinged door, and that an opposed wall portion is formed in an opening portion of a casing. Accordingly, the same components as or similar components to those of the first embodiment are described with reference to the description and drawings of the first embodiment, and detailed description thereof is omitted.

Although not shown, similarly to the first embodiment, the door locking device according to the second embodiment of this invention is applied to an outdoor apparatus serving as an apparatus constructing a system for a self-service gas station, which is exemplified as an electronic apparatus including the door that needs to be locked. However, in this embodiment, the outdoor apparatus includes the single-hinged door arranged in the opening portion of the casing.

In the self-service gas station, the single-hinged door is arranged on a front surface of the casing exposed from a dedicated rack. The door is manufactured by press working a metal with high viscosity, such as stainless steel or a plated steel sheet.

The door locking device according to the second embodiment of this invention includes, similarly to the first embodiment, as a locking mechanism, a pivot end wall portion, an opposed wall portion, a key cylinder, and pivot hooks.

The pivot end wall portion extends from a pivot end side of the door toward an inner side of the door, and has a first through-hole formed therein. A plurality of first through-holes are formed in line along the pivot end side.

The opposed wall portion is opposed to the pivot end wall portion when the door is closed, and has a second through-hole formed therein correspondingly to the first through-hole.

In this embodiment, in particular, the opposed wall portion is formed so as to extend from an opening side of the opening portion of the front surface of the casing toward an inside of the casing. A plurality of second through-holes are formed in line along the opening side correspondingly to the plurality of first through-holes.

The key cylinder is fixed to the door through intermediation of a plate member, and includes a movable element arranged on the inner side of the door and configured to be displaced in a pivoting manner between an unlocked position and a locked position in accordance with unlocking/locking operation performed with a key on an outer side of the door.

The pivot hooks each have a hook shape, and are mounted on the inner side of the door so as to interlock with the movable element of the key cylinder through link members.

The plate member configured to support the key cylinder, the link members, the pivot hooks, and the like are manufactured by casting a metal with high viscosity, such as stainless steel.

When the movable element is at the unlocked position, the pivot hooks retreat to the inner side of the door with respect to the first through-holes of the pivot end wall portion.

Meanwhile, when the movable element is at the locked position, the pivot hooks enter narrow portions of the second through-holes of the opposed wall portion formed in the casing through the first through-holes of the pivot end wall portion, thereby preventing (prohibiting) the door from being opened. At this time, the pivot hooks firmly keep the pivot end wall portion and the opposed wall portion overlapping each other.

Also in this embodiment, each pivot hook may include a retaining flange portion having a retaining surface that is positioned in parallel to a wall surface of the opposed wall portion on a side opposite to the pivot end wall portion when the pivot hook enters the second through-hole of the opposed wall portion through the first through-hole. In this case, the pivot hook further firmly keeps the pivot end wall portion and the opposed wall portion overlapping each other against a force of cancelling the keeping. Under a locked state, the retaining surface is opposed to a back surface of the opposed wall portion with a slight gap.

Even when the door is closed, a slight clearance (for example, approximately 1.5 mm) is defined between the door and the opening portion of the casing (between the pivot end wall portion and the opposed wall portion). The clearance is needed in order to ensure a margin for a clearance of each component, and to avoid collision between the pivot end sides at the time of pivot of the door. However, a crowbar or the like may be inserted into the clearance. Therefore, the door locking device according to this invention may include a flange portion that is formed along an outer surface of the door so as to protrude from the pivot end side, and is configured to cover the clearance defined between the pivot end wall portion and the opposed wall portion when the door is closed. The flange portion is manufactured by casting a metal with high viscosity, such as stainless steel.

In addition, also in this embodiment, similarly to the first embodiment, the door locking device includes, in addition to the above-mentioned locking mechanism including the pivot hooks, a closed door keeping mechanism including a rod member and a crescent member.

The closed door keeping mechanism of the door locking device according to this embodiment includes a support fitting and the rod member.

On the inner side of the door, the rod member is crank-coupled to the movable element of the key cylinder through intermediation of the crescent member serving as a crank member, and is displaced linearly by interlocking with the movable element. Further, when the door is closed and the movable element of the key cylinder is at the locked position, a distal end of the rod member is held in contact with a rod receiving surface formed in the casing to face in a direction of closing the door. Thus, the rod member keeps a closed state (closed posture or closed position) of the door.

The rod member includes a rod body obtained by bending an elastic metal rod, such as stainless steel, an insert portion formed at a lower end of the rod body, a metal cap portion mounted to an upper end of the rod body, and two rollers made of a metal or a resin and rotatably mounted to the cap portion.

The rod member is mounted to the door through intermediation of the support fitting so as to be capable of being linearly displaced in an up-and-down direction of the casing and the door. The support fitting is made of a metal, and includes a main portion, a mount portion to be mounted to the inner side of the door by welding, screw fixation, or the like, and perforated tab portions through which the rod body of the rod member is slidably inserted. A hole of each of the perforated tab portions has such a dimension that almost no clearance is defined between the dimension of the hole and a diameter dimension of the rod body in a depth direction of the casing and the door.

On an upper side of the opening portion of the casing, the rod receiving surface is formed to face in the direction of closing the door. The rod receiving surface includes an inclined portion configured to guide arrival of the rollers that are displaced (lifted up) from the lower side to the upper side when the unlocked state is shifted to the locked state, and a flat surface portion formed continuously with the inclined portion. Further, when the door is closed and the movable element of the key cylinder is at the locked position, the rollers guided on the inclined portion of the rod receiving surface are held in contact with the flat surface portion. Thus, the rod member keeps the closed state (closed posture or closed position) of the door.

The closed door keeping mechanism of the door locking device according to this embodiment further includes the crescent member.

The crescent member is coupled to the movable element of the key cylinder on the inner side of the door, and is displaced in a pivoting manner by interlocking with the movable element. Further, when the door is closed and the movable element of the key cylinder is at the locked position, a distal end of the crescent member is held in contact with a crescent receiving surface formed in the casing to face in the direction of closing the door. Thus, the crescent member keeps the closed state (closed posture or closed position) of the door together with the rod member.

Meanwhile, on a lower side of the opening portion of the casing, the crescent receiving surface is formed to face in the direction of closing the door.

The crescent member is formed by subjecting an elastic metal material, such as stainless steel, to sheet metal processing, and includes a connection portion, the crescent portion having a circular arc hook shape, and the crank portion serving as a crank member for the above-mentioned rod member. The insert portion of the rod member is inserted into a hole of the crank portion. The crescent portion of the crescent member includes an inclined portion configured to guide arrival of the crescent member on the crescent receiving surface. Further, when the unlocked state is shifted to the locked state, the crescent portion of the crescent member is displaced (pivoted) counterclockwise. At this time, the inclined portion of the crescent portion is first brought into contact with the crescent receiving surface. Thus, the crescent member keeps the closed state (closed posture or closed position) of the door together with the rod member.

In an upper part of the opening portion of the casing, a urethane sheet, a rubber sheet, or the like is bonded to a region with which the closed door is to be held in contact. In this manner, even when the door is closed, foreign matters, such as rainwater and dust, can be prevented from intruding into the casing from a clearance inevitably defined between the casing and the door. That is, waterproofness and dustproofness are enhanced as compared to a case where only the closed door keeping mechanism is arranged. The urethane sheet or the like may be arranged in a lower part and a side part of the opening portion of the casing, and between the pivot end side (or the flange portion) of the door and a side of the opening portion of the casing that are held in abutment on each other when the door is closed. Further, instead of the urethane sheet or the like, a sheet made of a material different from urethane and rubber may be arranged as long as the material can prevent intrusion of foreign matters, and has elasticity so as not to impair a clearance in the direction of closing the door.

INDUSTRIAL APPLICABILITY

This invention is described above with reference to the embodiments. The configuration and details of this invention can be modified in various ways that can be understood by the person skilled in the art.

Description is herein made of the embodiments each relating to the door locking device applied to the outdoor apparatus that is employed for a self-service gas system as the electronic apparatus. However, this invention is also applicable to all types of electronic apparatus including a hinged door that is arranged in an opening portion of a casing and needs to be locked.

REFERENCE SIGNS LIST

10 pivot end wall portion
13A, 13B first through-hole
20 opposed wall portion
23A, 23B second through-hole
30 key cylinder
33 movable element 40A, 40B pivot hook
43A, 43B retaining flange portion
43Aa, 43Ab, 43Ba, 43Bb retaining surface
51, 52 link member
60 closed door keeping mechanism
61 support fitting
62 crescent member
62a connection portion
62b crescent portion
62c crank portion
66 rod member
66a rod body
66b insert portion
66c cap portion
66d roller
70 flange portion
80 key
91 rod receiving surface
91a inclined portion
91b flat surface portion
96 crescent receiving surface
100 outdoor apparatus
110 casing
110f front surface (front)
122U bill handling apparatus
123U printer for printing receipt
125U card reader apparatus
131, 132 door
160 urethane sheet

The invention claimed is:

1. A casing device comprising a casing, a hinged door and a door locking device, the casing having an opening portion opened in an opening direction, the hinged door being arranged on the opening portion of the casing, the door locking device being configured to lock the hinged door, wherein the door locking device comprises:
a key cylinder arranged on the hinged door, the key cylinder comprising a movable element arranged on an inner side of the hinged door and configured to be rotatably centered on an axis parallel to the opening direction between an unlocked position and a locked position in accordance with unlocking/locking operation; and
a pivot hook connected to the movable element of the key cylinder on the inner side of the hinged door and configured to be rotatable along with the movable element,
wherein the pivot hook is caught on the casing when the hinged door is closed and the movable element is at the locked position to prevent the hinged door from being opened, and
wherein the door locking device further comprises:
a rod member eccentrically and pivotally connected to the movable element of the key cylinder on the inner side of the hinged door and configured to be linearly slidable in a direction orthogonal to the opening direction based on a rotation of the movable element; and,
a crescent member, having a plate surface, concentrically connected to the movable element of the key cylinder on the inner side of the hinged door and configured to be rotatable along with the movable element,
wherein the casing comprises:
a rod receiving surface formed in the casing so as to face in a direction of closing the hinged door and orthogonal to the opening direction; and
a crescent receiving surface formed in the casing so as to face in the direction of closing the hinged door and orthogonal to the opening direction,
wherein the rod member comprises a roller arranged at the distal end of the rod member,
wherein the rod receiving surface of the casing comprises an inclined portion, having an inclined surface continued from the rod receiving surface, configured to guide arrival of the roller,
wherein the crescent member comprises an inclined portion, having an inclined surface continued from the plate surface of the crescent member, configured to guide arrival of the crescent member on the crescent receiving surface,
wherein, when the hinged door is closed and the movable element is at the locked position, the roller guided on the inclined portion is held in contact with the rod receiving surface so that the rod member keeps the closed state of the hinged door, and
wherein, when the hinged door is closed and the movable element is at the locked position, the inclined portion of the crescent member is first brought into contact with the crescent receiving surface so that the crescent member keeps the closed state of the hinged door together with the rod member.

2. The casing device according to claim 1, further comprising a urethane sheet or a rubber sheet bonded to a region of the casing with which the closed hinged door is to be held in contact.

3. The casing device according to claim 1, further comprising
a second door forming a set of double doors together with the hinged door being a first door, and
wherein the first door further comprises a flange portion that is formed so as to protrude from a first pivot end side of the first door, and is held in contact with and covers a second pivot end side of the second door when the first door and the second door are closed.

4. An electronic apparatus, comprising the casing device of claim 1.

5. An electronic apparatus, comprising the casing device of claim 2.

6. An electronic apparatus, comprising the casing device of claim 3.

* * * * *